United States Patent

[11] 3,549,912

[72] Inventor Roger G. Lewis
Toronto, Ontario, Canada
[21] Appl. No. 618,690
[22] Filed Feb. 27, 1967
[45] Patented Dec. 22, 1970
[73] Assignee Collins Radio Company
Cedar Rapids, Iowa
a corporation of Iowa

[54] JK FLIP-FLOP
5 Claims, 2 Drawing Figs.

[52] U.S. Cl. .......... 307/292, 307/291, 307/247
[51] Int. Cl. .......... H03k 3/12
[50] Field of Search .......... 307/289, 291, 292, 247; 328/195, 196

[56] References Cited
UNITED STATES PATENTS

| | | | |
|---|---|---|---|
| 2,973,438 | 2/1961 | Clark | 307/247 |
| 3,047,737 | 7/1962 | Kolodin | 307/247 |
| 3,154,698 | 10/1964 | Lynch | 307/291 |
| 3,305,728 | 2/1967 | Bailey | 307/292 |
| 3,309,529 | 3/1967 | Bates | 328/196 |
| 3,321,639 | 5/1967 | Fowler | 307/291 |
| 3,351,778 | 11/1967 | Seelbach | 307/291 |
| 3,401,273 | 9/1968 | May | 307/291 |
| 3,403,266 | 9/1968 | Heuner et al. | 307/292 |

OTHER REFERENCES

P.M. Chirlian, ANALYSIS AND DESIGN OF ELECTRONICS CIRCUITS 1965 P-480, 481, 482, 483, 484.

*Primary Examiner*—Donald D. Forrer
*Assistant Examiner*—J. D. Frew
*Attorney*—Donald W. Phillion

ABSTRACT: Disclosed is a JK Flip-Flop circuit using series connected transistors as the J & K inputs in place of the usual diodes. The result is a more rapid change of state of the Flip-Flop.

PATENTED DEC 22 1970 3,549,912

INVENTOR.
ROGER G. LEWIS
BY Moody & Hallacher
ATTORNEYS

JK FLIP-FLOP

This invention relates generally to a class of circuitry known as bistable multivibrators and particularly to a class of such circuits commonly called JK flip-flops.

The use and operation of JK flip-flop circuits is known in the art and have been employed for several years. The operation of these circuits is such that a change of state of the bistable multivibrator can be accomplished only by the application of at least two input signals, one to the clock terminal and one to either the J or K terminals depending on the present state of the flip-flop. In the circuits presently available in the art the input signals are applied through a system of diodes and RC charging networks. The presently available JK flip-flops therefore suffer the inherent disadvantage of requiring a fairly long time interval in order to effect a change of state of the flip-flop circuit.

It is therefore an object of this invention to provide a JK flip-flop circuit which eliminates the need for input diodes and an RC charging network.

It is another object of this invention to provide such a circuit which affords a rapid change of state of the flip-flop circuit.

It is another object of this invention to provide such a circuit which has the operational characteristics of a logic AND gate.

It is another object of this invention to provide a high speed input low impedance dividing circuit which comprises several JK flip-flop circuits.

Further objects, features, and advantages of the invention will become apparent from the following description and claims when read in view of the accompanying drawings wherein like numbers indicate like parts and in which:

Figure 1:
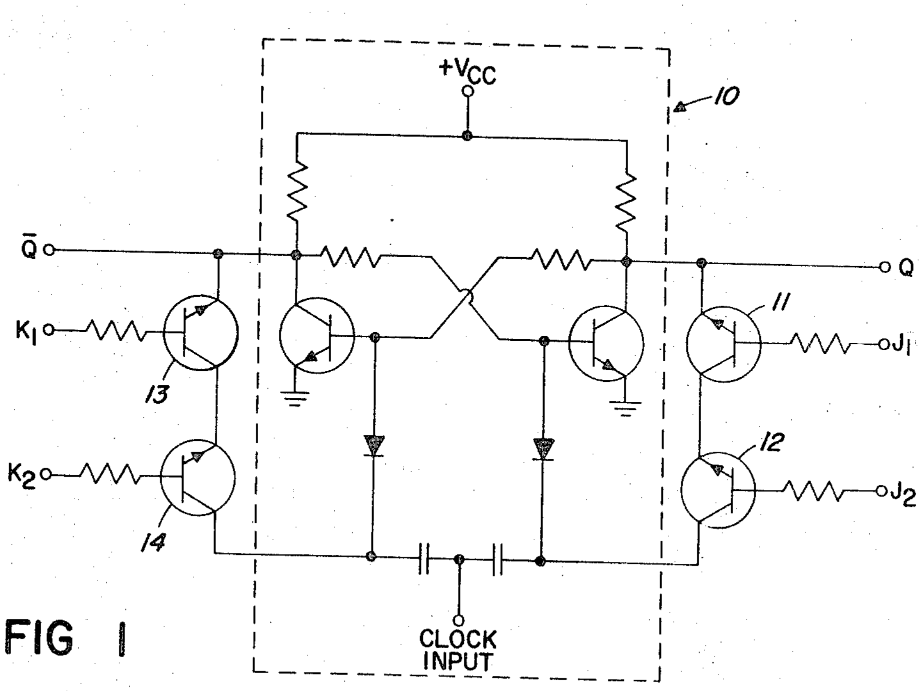
FIG. 1 shows the JK flip-flop which constitutes the present invention.

FIG. 1 shows a standard multivibrator enclosed in broken lines and indicated by reference number 10. Connected between the clock input and the Q output of flip-flop 10 is a pair of series connected transistors 11 and 12. The base of transistor 11 serves as the $J_1$ input and the base of transistor 12 serves as the $J_2$ input. Connected between the clock input and the $\bar{Q}$ output is a second pair of series connected transistors 13 and 14. The base of transistor 13 serves as the $K_1$ input and the base of transistor 14 serves as the $K_2$ input. In order to effect a change of state of the Q output from the O state to the 1 state it is necessary to have an input signal present on both the $J_1$ and $J_2$ inputs thus rendering transistors 11 and 12 conductive through a clock pulse applied to the clock input accomplishing the transition to the 1 state. When in the J state, both transistors 11 and 12 are rendered conductive by signals present on the $J_1$ and $J_2$ input. After the flip-flop has assumed the J condition, in which instance both transistors 11 and 12 are turned on, the condition of flip-flop 10 will not change until both the $J_1$ and $J_2$ signals are removed and a signal is present at both the $K_1$ and $K_2$ inputs. The flip-flop then changes to the K state. Because a change of state requires two input signals the flip-flop logic is very similar to that of the logic AND gate which is well-known in the art. It should be noted that although two transistors are shown in each side of the flip-flop circuit any number of transistors can be used to thereby increase the number of input signals required to effect a change of state. The primary limiting factor on the number of input transistors used is the voltage drop across each transistor. However, because the voltage drop across each transistor is small, the total number of transistors used greatly exceeds the number of diodes which can be used in the prior art circuit. The FIG. shows two in use and this can be increased to at least four. Too large a number of transistors ultimately result in a total voltage drop sufficient to render the circuit inoperative. It should also be noted that either PNP or NPN transistors can be used in the circuit. However, all four transistors used should be of the same polarity.

Figure 2:
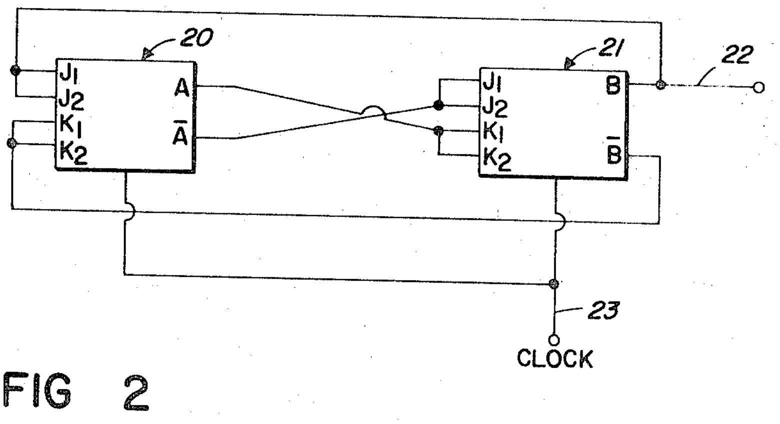
FIG. 2 shows the connection of two of the inventive JK flip-flops in a manner permitting the division of an input signal by a factor of four.

FIG. 2 shows a connection of two of the inventive JK flip-flops connected to act as a dividing circuit having a dividing factor of four. In this circuit both the clock inputs of the two flip-flops 20 and 21 are connected to the common clock input 23. Both the $K_1$ and $K_2$ inputs of flip-flop 20 are connected to the $\bar{B}$ output of flip-flop 21. The $J_1$ and $J_2$ inputs of flip-flop 20 are connected to the B output of flip-flop 21. The divided output of the dividing circuit is taken from the output line 22. The $K_1$ and $K_2$ inputs of flip-flop 21 are connected to the A output of flip-flop 20. The $J_1$ and $J_2$ inputs of flip-flop 21 are connected to the $\bar{A}$ of flip-flop 20. The cascaded circuit results in the dividing of the clock input PRF by a factor of four. The divided output is present on the output terminal 22. This divider has the primary advantage of being very rapid.

Although this invention has been described with respect to a particular embodiment thereof, it is not to be so limited, as changes and modifications may be made therein which are within the spirit and scope of the invention as defined by the appended claims.

I claim:

1. A bistable electronic circuit comprising: a bistable trigger circuit having first and second input terminals and first and second output terminals only one of which contains an output at a given instance, an input source connected to said first and second input terminals for causing said output terminals to alternately contain output signals, a first plurality of serially connected electronic control devices connecting said first output terminal to said input source, and a second plurality of serially connected electronic control devices connecting said second output terminal to said input source, the input control devices being similar and each having a control electrode, and means for applying a control signal to the controlled electrode of either plurality of electronic devices to cause the presence of an output signal at the respective output terminals.

2. The circuit of claim 1 wherein said bistable trigger circuit is a multivibrator and said electronic control devices are transistors the bases of which are said control electrodes.

3. The circuit of claim 2 wherein the transistors of each plurality are series connected emitter to collector and the emitter of one transistor of each plurality is respectively connected to one of said output terminals.

4. A binary divider circuit comprising a first and second bistable electronic circuit; said first and second bistable circuits each comprising; a multivibrator having an A output and an $\bar{A}$ output which alternately receives an output signal, means for receiving a pulsing input for actuating said multivibrator to cause alternation of said output signals, a first pair of control devices serially connected between said A output and said means for receiving a pulsing input, the first of said control devices having a $J_1$ control electrode and the other of said control devices having a $J_2$ control electrode, a second pair of control devices serially connected between said $\bar{A}$ output and said means for receiving a pulsing input, the first control device of said second pair having a $K_1$ control electrode and the other control device of said second pair having a $K_2$ control electrode, and means connecting said first and second bistable electronic circuits so that the input to said divider is divided by four.

5. The divider of claim 4 wherein said bistable circuits are multivibrators and said means connecting comprises; a connection between said $J_1$ and $J_2$ terminals of said first multivibrator and said A output of said second multivibrator, a connection between said $K_1$ and $K_2$ terminals of said first multivibrator and said $\bar{A}$ output of said second multivibrator, a connection between said A output of said first multivibrator to said $K_1$ and $K_2$ terminals of said second multivibrator, a connection between said $\bar{A}$ output of said first multivibrator and said $J_1$ and $J_2$ terminals of said second multivibrator, and said means for receiving of said first and second multivibrator being connected to a common pulsing input.